March 12, 1968 P. J. NIELAND 3,372,782
CLUTCH WITH NON-ROTATABLE CAM ACTUATOR
Filed Jan. 3, 1966 2 Sheets-Sheet 1
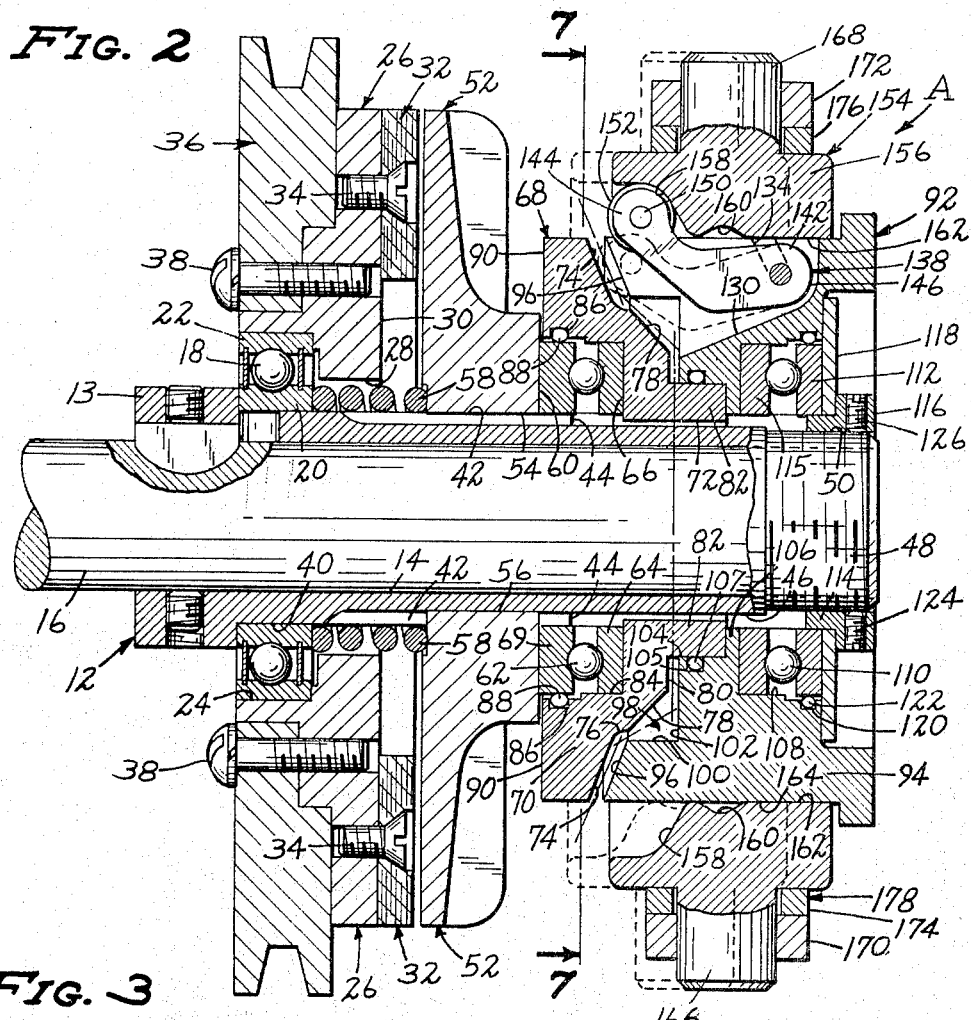
FIG. 2
FIG. 3
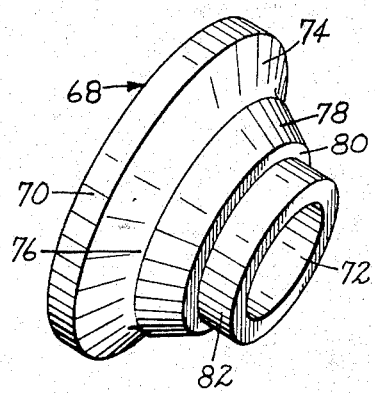
FIG. 4
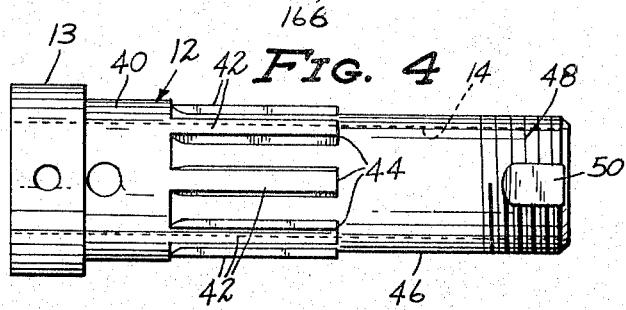
INVENTOR.
PAUL J. NIELAND
BY
Caswell, Lagaard & Wicks
ATTORNEYS United States Patent Office 3,372,782
Patented Mar. 12, 1968

3,372,782
CLUTCH WITH NON-ROTATABLE
CAM ACTUATOR
Paul J. Nieland, South St. Paul, Minn., assignor to Horton
Manufacturing Co., Inc., Minneapolis, Minn.
Filed Jan. 3, 1966, Ser. No. 518,455
1 Claim. (Cl. 192—93)

ABSTRACT OF THE DISCLOSURE

This disclosure relates to a mechanical clutch which includes a hub mountable on a shaft with an annular driving member rotatably mounted on the hub together with a friction disc member slidably mounted on the hub. Further included is a pressure ring slidable axially on the hub for pressure engagement with the friction member together with an annular carrier member carried by the hub which mounts a plurality of pivoted spaced finger pressure members for pressure engagement with the pressure ring, and a cam ring carried by the carrier member and slidable thereon for pressing the finger members which move the pressure ring to move the friction member into engagement with the driving member to cause rotation of a shaft secured to the hub.

---

The invention relates broadly to clutches and more particularly to a mechanical clutch with which a driving member may be selectively caused to rotate a driven member.

It is an object of the invention to provide a clutch which is compact in nature having a minimum axial length which is to say that for an equivalent horsepower transfer the clutch is smaller in size.

It is a further object to provide a clutch wherein axial movement of a pressure ring for causing contact of a single friction disc with a single driving disc is accomplished through an axial thrust created by a multiplicity of pivoted finger members carried by a carrier member and actuated by a cam ring causing the fingers to bear against the pressure ring.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 2 is a section on the line 2—2 of FIGURE 1 with the parts shown in engagement in broken lines.

FIGURE 3 is a perspective view of the pressure ring removed from the clutch.

FIGURE 4 is a side elevation of the hub removed from the clutch.

FIGURE 5 is a side elevation of the finger carrier member removed from the clutch.

FIGURE 6 is a section on the line 6—6 of FIGURE 5.

FIGURE 7 is a section on the line 7—7 of FIGURE 2.

FIGURE 8 is a perspective view of one of the fingers removed from the clutch.

Figure 1:
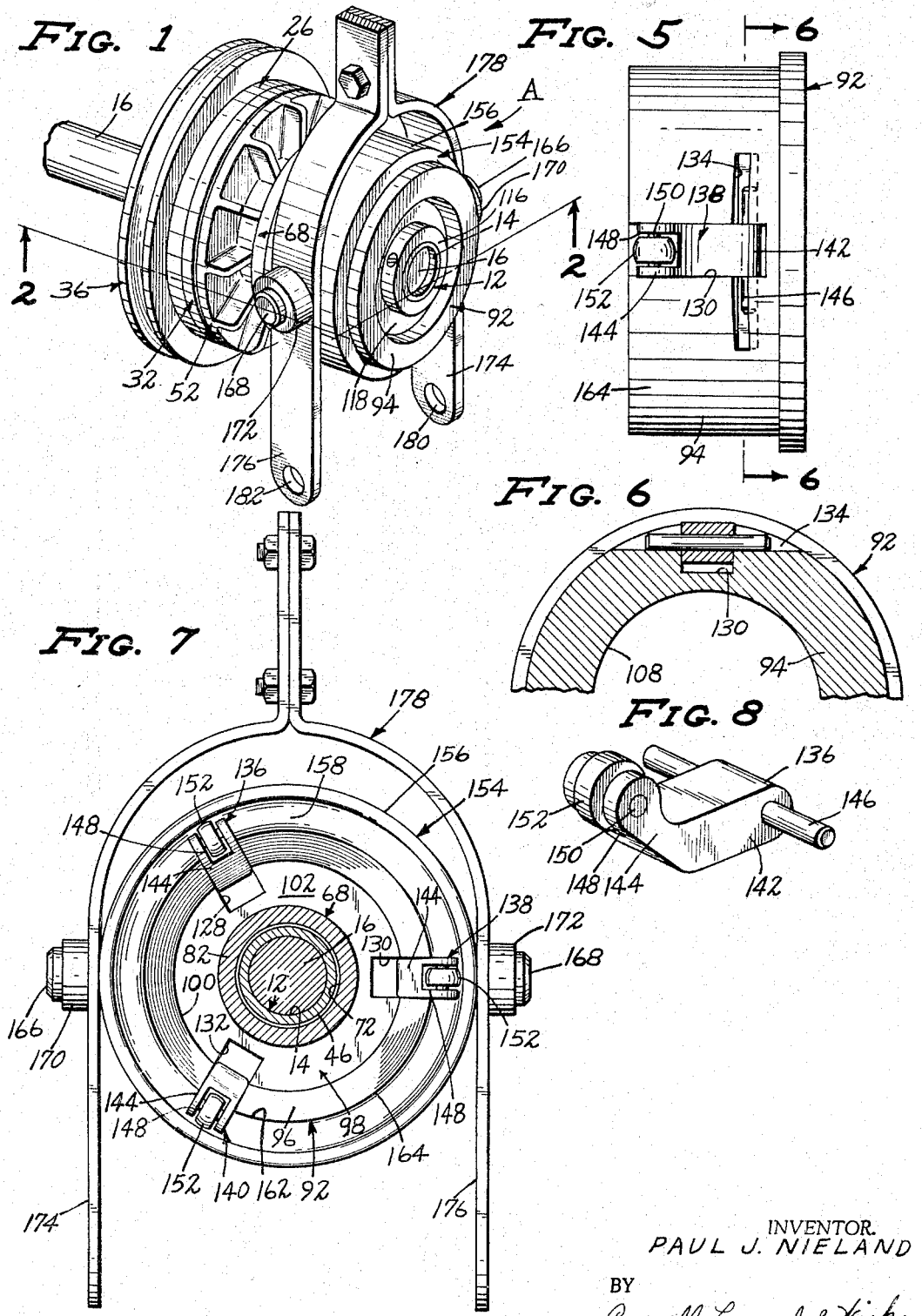
FIGURE 1 is a perspective view of the clutch embodying the invention with a yoke shown for the operation of the clutch.

Referring to the drawings in detail, the clutch A includes the hub 12 which has formed on one end thereof the annular rim portion 13 and extending through the hub is the axial bore 14 through which extends the shaft 16. Mounted on the hub 12 is the bearing 18 with the inner race 20 thereof press fit on the hub 12 against the rim portion 13. The outer race 22 of the bearing 18 is press fit in the annular recess 24 formed in the circular drive disc 26. The drive disc 26 is formed with the axial hole 28, through which the hub 16 freely extends, and secured to the inner face 30 of the disc 26 is the friction facing ring 32 by means of the bolts 34 engaging the disc. Secured upon the disc 26 is the sheave 36 by means of the bolts 38.

The hub 16 is also formed with the uninterrupted portion 40, and extending inwardly from the portion 40 are the splines 42 terminating at 44 followed by the reduced portion 46 which terminates in the threaded portion 48 formed with the flat portion 50.

Further provided is the friction disc 52 formed with the axial bore 54 having splines 56 in sliding engagement with the splines 42 of the hub 12.

Positioned on the hub 12 is the coil spring 58 which is interposed between the inner race 20 of the bearing 18 and the friction disc 52 and which extends through the axial hole 28 of the drive disc 26. The spring 58 normally urges the friction disc 52 from and out of contact with the friction facing ring 32. The friction disc 52 is formed with the annular face shoulder 60.

The numeral 62 designates a bearing the inner race 64 of which is press fit within the annular recess 66 of the pressure ring 68. The bearing 62 also includes an outer race 69. The pressure ring 68 includes the annular body 70 in which the recess 66 is formed on the inner portion thereof and the axial hole 72. The surface of the hole 72 is free from the portion 46 of the hub 12 but is movable axially with respect to the portion 46 of hub 12. The pressure ring body 70 also includes the outer conoidal surface 74 which is formed at substantially 22½° from a line normal to the longitudinal axis of the ring 68. The outer conoidal surface 74 terminates inwardly in the annular step 76 which in turn terminates in the inner conoidal surface 78. The inner conoidal surface 78 is formed at substantially 45° from a line normal to the longitudinal axis of ring 68 and terminates in the annular wall 80 which is normal to the longitudinal axis of the ring, and the wall 80 terminates in the annular shoulder portion 82. Formed in the outer wall portion 84 of the recess 66 is the annular recess 86 in which is positioned the O-ring 88. The radial wall face 90 of the ring 68 and the outer race 69 of the bearing 62 have a working contact with the shoulder face 60 of the friction disc 52 which will be more fully described hereinafter.

The numeral 92 designates a finger carrier member which includes the annular ring body 94 formed with the annular conoidal shoulder 96. The conoidal shoulder 96 terminates at its inner edge in the annular recess 98 formed of the outer wall 100 parallelly disposed to the axis of the hub 12 and the wall 102 normal to the axis of the hub. The inner edge of the wall 102 terminates in the inner annular wall 104 parallel to the axis and which fits upon the annular shoulder 82 of the pressure ring 68. The inner annular wall 104 is formed with the recess 105 in which is positioned the O-ring 107 whereby there is sealing engagement between wall 104 and the outer surface of the annular shoulder 82. The wall 104 terminates in the radially disposed flange 106. The flange 106 together with the recessed annular wall 108 form a recess in which is mounted the bearing 110. The outer race 112 of the bearing 110 is press fit on the collar 114, the collar 114 being threadedly engaged with the threaded portion 48 of the hub 12.

The inner race 115 of the bearing 110 is press fit in the annular wall 108 against the flange 106. The collar 114 has formed thereon the annular flange 116 which abuts the washer 118, the washer 118 abutting the annular body 94 of the finger carrier 92. The pressure ring 68 and the finger carrier 92 do not rotate, but the hub 12, collar 114 and washer 118 rotate by means of bearings 62 and 110. Formed in the surface of the annular wall 108 of the body 94 of the finger carrier 92 is the recess 120 in which is mounted the O-ring 122 which makes sealing engagement with the inner surface of the outer race 112 of bearing 110.

The bearing race 112 is mounted on the collar 114 and rotates with the collar which rotates with the hub 12 to which the collar is threadedly engaged and secured by means of the set screws 124 and 126. The hub 12 rotates when the clutch is in engagement, the operation of which will be more fully explained hereinafter.

The finger carrier 92 is also formed with the radially disposed space recesses 128, 130 and 132, and intersecting each recess is a pin slot 134. The pin slots 134 are angularly disposed to a plane normal to the axis of the finger carrier 92 and hub 12 (FIGURES 2 and 5). Further provided are the identical fingers 136, 138 and 140, one for each of the recesses 128, 130 and 132, respectively. Only the finger 136 will be described in detail as all the fingers are identical. The finger 136 includes the base portion 142 and extending angularly from the outer end thereof is the short arm portion 144. Mounted on the inner end of the base portion 142 of the finger 136 is the pin 146 extending transversely thereof. The arm portion 144 has formed on the outer end the slot 148 in which is positioned the shaft 150 on which is mounted the roller 152. The finger 136 is pivotally mounted on the finger carrier by means of the pin 146 positioned in the pin slot 134, FIGURES 2, 5 and 6, and as a result the finger can be moved from the position shown in full lines to that in broken lines as shown in FIGURE 2 and explained hereinafter.

The numeral 154 designates a cam ring which includes the annular ring-like body 156 mounted concentrically with the finger carrier 92 and the hub 12 for axial movement. The body 156 includes the short outer annular lip portion which terminates inwardly in the annular arcuate cam surface 158 which terminates in the inner annular groove 160 which terminates in the inner annular wall portion 162. The outer portion of the annular wall portion 162 bears on the annular outer wall portion 164 of the finger carrier 92 for slidable movement thereon. The annular arcuate cam surface 158 is in contact with the rollers 152 of the fingers 136, 138 and 140, and as the cam ring 154 is moved axially towards the friction disc 52 the fingers are pivoted downwardly with the rollers thereof whereby the rollers contact the outer conoidal surface 74 of the pressure ring 68 which moves the ring 68 axially on the hub 12 which in turn forces the outer race 69 of bearing 62 against the friction disc 52 thereby moving the disc 52 axially and into engagement with the drive disc 26 whereby rotational movement is imparted to the friction disc which drives the shaft 16 by means of the splines of the disc 26 in engagement with the splines of the hub, the hub being secured to the shaft. Thus with the construction disclosed above rotational movement of the disc 26 is selectively imparted to the shaft 16 and withdrawn by actuating the cam ring 154. It will be seen that as the pressure ring 68 is moved axially there is sliding movement of annular shoulder 82 upon inner annular wall 104 of finger carrier 92 which does not move axially nor does carrier 92 rotate. The hub rotates relative to the finger carrier 92 by means of the bearing 110, the race 112 mounted on the collar 114. The ring 68 does not rotate but the rotational movement of disc 52 is picked up by the race 69 of bearing 62. The collar 114 rotates relative to carrier 92 by means of race 112 of bearing 110.

The cam ring 154 has formed thereon the trunnions 166 and 168 which extend through collars 170 and 172, respectively, of the yoke 178. The yoke 178 may be pivotally moved by means not shown, extending through the holes 180 and 182 of the yoke arms 174 and 176, respectively, to thereby move the cam ring axially as above described.

Through use the friction facing 32 will become worn and reduced in thickness. To compensate for this wear, the set screw 126 is loosened and the collar 114 advanced upon the threads of the hub thereby axially moving all of the elements between the collar and the disc 52 to reestablish the proper position of said elements relative to the disc 52 for proper operation of the clutch. The clutch may be releasably locked in engagement by moving the cam ring 154 axially so that the finger rollers 152 engage in the inner annular groove 160. The rollers 152 are easily forced out of the groove 160 by a slight axial thrust upon the cam ring 154.

The invention is not to be understood as restricted to the details set forth since these may be modified within the scope of the appended claim without departing from the spirit and scope of the invention.

Having thus described the invention, what is claimed as new and desired to be secured by Letters Patent is:

1. A mechanical clutch comprising:
   (a) a hub for securement to a shaft,
   (b) an annular driving member rotatably mounted on said hub,
   (c) a friction disc member slidable axially on said hub adjacent said driving member,
   (d) a pressure ring slidable axially on said hub for axially moving said friction member,
   (e) a roller bearing mounted on said pressure ring for engagement with said friction disc member and to allow relative rotational movement between said friction member and said pressure ring,
   (f) an annular carrier member for pressure members carried by said hub,
   (g) a roller bearing carried by said annular carrier member and said hub to allow relative rotational movement therebetween,
   (h) a plurality of pressure finger members pivotally mounted on said annular carrier member for pressure engagement with said pressure ring,
   (i) an annular cam ring carried by said annular carrier member and slidable thereon for pressing engagement with said finger pressure members to cause said finger pressure members to bear against and move said pressure ring to thereby cause said pressure ring to move said friction member into engagement with said driving member to cause rotation of a shaft secured to said hub as a result of the rotation of said driving member.

References Cited

UNITED STATES PATENTS

| 2,140,619 | 12/1938 | Dunkelow | 192—93 X |
| 2,367,390 | 1/1945 | Firth et al. | 192—93 |
| 2,776,031 | 1/1957 | Turnguist et al. | 192—93 X |
| 3,250,353 | 5/1966 | Liszewski et al. | 192—85 X |

BENJAMIN W. WYCHE III, *Primary Examiner.*